(12) United States Patent
Limpens et al.

(10) Patent No.: US 12,534,543 B2
(45) Date of Patent: Jan. 27, 2026

(54) METHOD FOR OBTAINING AN INULIN-CONTAINING COMPOSITION

(71) Applicant: BENEO-ORAFTI SA, Oreye (BE)

(72) Inventors: Benjamin Limpens, Namur (BE); Linda Mertens, Schaarbeek (BE); Jan Van Loo, Huldenberg (BE)

(73) Assignee: BENEO-ORAFTI SA, Oreye (BE)

( * ) Notice: Subject to any disclaimer, the term of this patent is extended or adjusted under 35 U.S.C. 154(b) by 501 days.

(21) Appl. No.: 18/016,575

(22) PCT Filed: Jul. 15, 2021

(86) PCT No.: PCT/EP2021/069892
§ 371 (c)(1),
(2) Date: Jan. 17, 2023

(87) PCT Pub. No.: WO2022/013406
PCT Pub. Date: Jan. 20, 2022

(65) Prior Publication Data
US 2023/0303723 A1    Sep. 28, 2023

(30) Foreign Application Priority Data
Jul. 16, 2020  (EP) .................... 20186309

(51) Int. Cl.
*C08B 37/00*  (2006.01)
(52) U.S. Cl.
CPC ................. *C08B 37/0054* (2013.01)
(58) Field of Classification Search
CPC ............. C08B 37/0054; C08B 37/0003
See application file for complete search history.

(56) References Cited

U.S. PATENT DOCUMENTS

| | | | |
|---|---|---|---|
| 5,478,732 A | 12/1995 | Kunz et al. | |
| 6,399,142 B1 | 6/2002 | Silver | |
| 2009/0202705 A1 | 8/2009 | Meuser et al. | |

FOREIGN PATENT DOCUMENTS

| | | | |
|---|---|---|---|
| CN | 101580557 | 11/2009 | ............ C08B 37/18 |
| CN | 102898548 | 1/2013 | ............ C08B 37/18 |
| CN | 103044579 | 4/2013 | ............ C08B 37/18 |
| CN | 107325205 | 11/2017 | ............ C08B 37/18 |
| CN | 111057166 | 4/2020 | ............ C08B 37/18 |
| DE | 4426662 | 7/1994 | ............ A23L 1/09 |
| EP | 0627490 A1 | 12/1994 | |
| EP | 0930317 | 7/1999 | ............ C08B 37/18 |
| EP | 2698387 | 2/2014 | ............ C08B 37/18 |
| RU | 2383625 | 10/2008 | ............ C13K 11/00 |
| SU | 1724156 | 4/1992 | |
| WO | WO2009077207 | 6/2009 | ............ A23L 1/015 |
| WO | WO2010102806 | 9/2010 | ............ C08B 38/18 |

OTHER PUBLICATIONS

Srinameb et al., Plant Foods Hum. Nutr., 2015, 70, p. 221-226. (Year: 2015).*
Khuenpet, Krittiya & Jittanit, Weerachet & Sirisansaneeyakul, Sarote & Srichamnong, Warangkana. (2018). The application of purification process for inulin powder production from Jerusalem artichoke (*Helianthus tuberosus* L.) tuber powder. Journal of Food Processing and Preservation. 42. 10.1111/jfpp.13695.
PCT International Search Report, Written Opinion and International Preliminary Report on Patentability issued in PCT/EP2021/069892, dated Oct. 7, 2021, 17 pgs.
Third Party Observation filed in PCT/EP2021/069892, dated Nov. 8, 2022, 17 pgs.

* cited by examiner

*Primary Examiner* — Jonathan S Lau
(74) *Attorney, Agent, or Firm* — Hayes Soloway P.C.

(57) ABSTRACT

A method for obtaining an inulin-containing composition includes providing an inulin-containing plant material, such as *Cichorium intybus* roots, and providing the inulin-containing plant material in particulate form, wherein the particles have a particle size distribution such that at most 45 vol % of the particles has a size≤0.15 mm, and at least 90 vol % of the particles has a size≤4.0 mm. The optionally dried particulate inulin-containing plant material is then subjected to an extraction step in which the inulin is extracted from the plant material to obtain an inulin-enriched juice and an inulin-depleted pulp, which are then separated, preferably by either vacuum filtration, pressure filtration and/or centrifugation.

19 Claims, 8 Drawing Sheets

METHOD FOR OBTAINING AN INULIN-CONTAINING COMPOSITION

TECHNICAL FIELD OF THE INVENTION

The invention relates to a method for obtaining an inulin-containing composition from an inulin-containing plant material, such as originating from subterranean material from the Compositae family, and preferably comprising *Cichorium intybus* roots and/or *Helianthus tuberosus* tubers. The inulin-containing compositions may for instance be used as food ingredient or in biologically active food additives.

BACKGROUND OF THE INVENTION

Inulin is a carbohydrate of the polysaccharides group occurring in a.o. tubers and roots of plants of the Compositae family. There are more than 36000 different plants which provide inulin, among them, chicory (*Cichorium intybus* L.) and Jerusalem artichoke (*Helianthus tuberosus*). Inulin may be obtained as an amorphous powder and/or in the form of crystals that are readily soluble in hot water. As meant herein, the term inulin also includes oligosaccharides with a relatively low degree of polymerization DP from 2 to 10, referred to as oligofructose or fructooligosaccharide.

A known procedure for the isolation of inulin from plants is extraction, typically with water. As is well-known, the conventional extraction procedure is similar to that used for sugar beets. Herein, the extraction takes place with fresh roots and shortly after or even directly after the harvest. These roots are cut in the shape of elongate roof-shaped elements, so called cossettes. This shape is preferred in the art for its large contact area and structural integrity. The cossettes are contacted with an aqueous extractant, and the inulin is extracted from the plant material to the extractant to obtain an inulin-enriched juice and an inulin-depleted pulp. Such a known method is for instance disclosed in EP 0930317.

In known methods, making the roots relatively small is generally avoided in order to prevent the substance from getting a mushy character, which is very hard to extract and process. Indeed, it is generally known when extracting sugar from sugar beets for instance that cossettes having a length<1 cm should be avoided. There is ample evidence for this requirement in the open literature.

The handbook 'Sugar Technology, Beet and Cane Sugar Manufacture' by P. W. van der Poel, H. Schiweck, T. Schwartz, Berlin, 1998, on page 328 discusses the technical extraction of beet. The mush content of the cut sugar beets is said to be of paramount importance to the efficiency of the extraction procedure. The mush content, defined as the mass of cossettes<1 cm long in relation to the total cossettes mass, should not exceed 5%. Given good slicing practice, an amount of 2% is even regarded as optimal.

This general knowledge is confirmed by other well know handbooks, such as the 'Manuel de Sucrerie', Ed. la Raffinerie Tirlemontoise SA, 1984, 4th Edition. At page 71, it is mentioned that at first glance, we would get the most thorough extraction by finely grinding of the beets, so as to shred beet cells and let their content flow out without difficulty. However, by grinding too finely, a juice containing an enormous quantity of non-sugars is collected, which must be eliminated afterwards. Further, the separation of the juice and the grating that contains the shredded cell walls is very difficult. This handbook therefore at page 59 also teaches against cutting the cossettes too fine, inter alia because one then creates a mass that is impenetrable for an extracting liquid.

Yet another general reference (Cursus Suikertechnologie CSM-RT, Ch. IV.1, pages 1, 4-9, 1986, in Dutch) confirms the requirement that the amount of cossettes having a length<1 cm should be limited to 3-5% maximally.

There is therefore a consistent teaching in the art that cossettes of <1 cm length should not be used, or be used to a small extent only, in order to obtain good extraction behavior. The size range below 1 cm is to be avoided.

Extraction is typically followed by separating the inulin-enriched juice as filtrate from the inulin-depleted pulp as retentate. The inulin-depleted pulp or retentate of the extraction process may for instance be used as animal fodder. Separation may be carried out by a number of methods, a non-limiting example being by filtration, pressing or centrifugation.

After the separation of the filtrate, comprising the inulin-enriched juice, and the retentate, comprising the inulin-depleted pulp, the juice may be further purified, if desired. This process may for instance comprise the step of lime addition and subsequent flocculation by adding $CO_2$ and filtration. The inulin-containing juice may colorize in this process, which is generally undesirable and therefore requires costly post-processing. Acid flocculation may also be used as an alternative. Such acid flocculation combined with filtration may require the presence of a filtration agent that prevents obstruction of the filter by destabilized proteins, for instance diatomaceous earth or 'kieselguhr'. This problem may be prevented when using centrifugation. The filtration agent has the disadvantage of degrading the inulin by hydrolysis at acid pH, and may be less active in removing part of the impurities.

Generally speaking, known methods for obtaining an inulin-containing composition suffer from relatively long extraction times implying the creation of degradation products as well as an increase of the risk for microbiological contamination, and/or consume a relatively high amount of water. Extraction typically takes around 1 h and more in order to achieve an acceptable yield. Weight ratios between the final juice or filtrate and the amount of input material, corrected to a typical dry substance of 25% in the fresh product of 1.2 to 1.6 and more, up to even 5 are not uncommon.

In the present description, claims and figures, the comma is used as the decimal separator.

Furthermore, the inulin-containing composition obtained in the known methods suffers from a relatively high content of fructose, sucrose and/or inulin with a reduced degree of polymerization (DP), either in absolute terms and/or relative to the total amount of inulin. Drying of the roots allows extraction of inulin all year round, without being dependent on the growing cycle. Drying is expected to cause (hemi) cellulose in the chicory root to stick together, forming a less porous structure, which is stabilizing the plant material enzymatically and microbiologically. In conventional methods, drying may be achieved by sun drying or drying in ovens of, for example, cossettes of chicory root.

SUMMARY OF THE INVENTION

It is an object of the present invention to provide a method for obtaining an inulin-containing composition with an increased profitability compared to the known methods described above. An increased profitability may involve extracting inulin from a plant material, such as a chicory root, at a faster rate, and/or may allow obtaining a juice with a higher concentration of inulin, which juice may advantageously be further processed with fewer subsequent concentration steps.

The above and other objects are achieved by a method in accordance with claim 1. The method comprises the steps of:
- providing an inulin-containing plant material;
- providing the inulin-containing plant material in particulate form, wherein the particles have a particle size distribution such that at most 45 vol % of the particles has a size≤0.15 mm, and at least 90 vol % of the particles has a size≤4.0 mm;
- subjecting the particulate inulin-containing plant material to an extraction step comprising contacting the particulate inulin-containing plant material with an aqueous extractant and extracting the inulin from the plant material to the extractant to obtain an inulin-enriched juice and an inulin-depleted pulp; and
- separating the inulin-enriched juice as filtrate from the inulin-depleted pulp as retentate, preferably by either vacuum filtration, pressure filtration and/or centrifugation.

The prior art, such as EP 0930317 is silent about the importance of particle size distribution in extracting inuline, in particular on an industrial scale. It is generally known that results obtained on laboratory scale are not easily scaled-up to a larger scale, such as pilot scale and industrial scale. With industrial scale is meant in the context of the present application that the method is carried out in an installation that is able to process at least 1000 kg raw material per 24 hours of operation, more preferably at least 3000 kg raw material, and most preferably between 5000 kg and 10000 kg per 24 hours, and even more. In an industrial method according to the invention, at least 1000 kg raw material (inulin-containing plant material) is provided per 24 hours of operation, more preferably at least 3000 kg raw material, and most preferably between 5000 kg and 10000 kg per 24 hours, which raw material is then processed further according to the claimed method steps.

The inulin-containing plant material preferably originates from subterranean material from the Compositae family, of the Cichorideae tribe and genus *Cichorium* e.g. species *Chicorium intybus* or *Taraxacum* spp., or from the same Compositae family and same tribe Cichorideae, but genus *Taraxacum*, e.g. *Taraxacum officinalis* or *Taraxacum* Kok-Sagyz, or from the same family Compositae but genus *Helianthus* e.g. *Helianthus tuberosus*, and more preferably comprising *Cichorium intybus* roots and/or *Helianthus tuberosus* tubers.

Extraction from plant material is consistently taught in the art to be performed on cossettes of larger than 1 cm (10 mm) in order to avoid problems. It is contrary to general knowledge and therefore very unexpected that a satisfactory extraction yield could be obtained at all when extracting particulate plant material having particle sizes in the range below 1 cm. The inventors have found that by selecting a specific range within the 'forbidden' size range of below 1 cm, a satisfactory yield can be obtained at relatively short extraction times; moreover, a favorable separation of inulin-enriched juice from inulin-depleted pulp may be achieved.

In a main embodiment of the invention, the selection of a specific range of particle sizes is combined with drying the inulin-containing plant material to a dry matter content of at least 80 wt. %, as measured by ISO 6496, prior to extraction. By drying and milling (grinding) plant roots before extraction in any suitable order, it has surprisingly been found that a favorable separation of inulin-enriched juice from inulin-depleted pulp may be achieved.

A particularly useful embodiment of the invention provides a method wherein the inulin-containing plant material is dried to a dry matter content of at least 80 wt. %, as measured by ISO 6496 before providing the inulin-containing plant material in said particulate form.

In an alternative main embodiment, a method is provided wherein the inulin-containing plant material is not dried before providing the inulin-containing plant material in said particulate form, and said particulate inulin-containing plant material is subjected to a prior separation step to remove a juicy fraction therefrom before said extraction. As meant herein the term 'not dried' means, in relation to inulin-containing plant material, that the inulin-containing plant material contains at least 50% of the amount of water it had when being harvested, preferably at least 60, 70, or even at least 80%. It has proven advantageous to separate the juicy fraction from the particles before the actual extraction is performed. This prior separation can be done by methods known in the art, such as by centrifugation. The prior separation step, executed before the extraction promotes reaching the necessary temperature and Brix levels in the subsequent extraction step. Also, the separation step (for instance by filtration) executed after the extraction has been shown to benefit from this prior separation step.

A more preferred embodiment of the method is provided wherein at most 30 vol % of the particles has a size≤0.15 mm, and at least 90 vol % of the particles has a size≤3.0 mm.

Even more preferred is an embodiment of the method wherein at most 30 vol % of the particles has a size≤0.10 mm, and at least 90 vol % of the particles has a size≤2.0 mm.

A most preferred embodiment relates to a method wherein at most 25 vol % of the particles has a size≤0.10 mm, and at least 70 vol % of the particles has a size≤1.0 mm.

In an embodiment of the invention at least 3 or 5 vol %, preferably at least 8 or 10 vol % of the particles has a size≤0.15 mm, preferably ≤0.12 mm or ≤0.10 mm. It was found that this may help to ensure an optimal flow of the extractant and/or inulin-enriched juice through the particulate mass, as the flow should preferably neither be too quickly, causing a less than optimal yield, nor too slow, causing an overly long duration of the method of the invention.

The particles of the ground plant material typically show a particle size distribution. Such a distribution may be manipulated further by removing or adding fractions that were obtained by passing the material through a sieve with a particular pore size. For instance, passing the ground plant material through a sieve with pore size 1 mm may remove a substantial fraction of the particles having a size≥1 mm. Another possibility is to remove a fraction of a particular size and add it again to the ground plant material in another weight fraction. For instance, in order to obtain a material in which at most 30 vol % of the particles has a size≤0.10 mm, one may first remove the fraction of particles having a size≤0.10 mm, and then add the desired amount below 30 vol % again.

The particle size distribution of a particulate inulin material that was previously dried according to one embodiment is conveniently measured by laser granulometry according to ISO 13320, using the Fraunhofer model. In such a distribution, the particle size $D_x$ is defined as that particle size for which x vol. % of the particles is smaller than $D_x$. In particular, $D_{90}=3$ mm in the distribution means that 90 vol. % of the particles has a size smaller than 3 mm, whereas $D_{45}$=0.15 mm in the distribution means that 45 vol. % of the particles has a size smaller than 0.15 mm.

The particle size distribution of a particulate inulin material that was not previously dried according to another embodiment is conveniently measured by image analysis. Image analysis results in quantitative interpretation of particle size and shape distributions. In digital image analysis the following steps may be distinguished: image acquisition, image restoration, segmentation and filtering, and image measurement resulting in a particle size distribution and predefined shape classes.

Other preferred embodiments are characterized in that at least 95 vol % of the particles has a size≤3.0 mm, even more preferred at least 99 vol % of the particles has a size≤3.0 mm, and most preferred substantially all particles have a size≤3.0 mm.

The benefits of the invented method turn out to be surprisingly significant and involve the possibility of a reduction of the extraction time from about 1 hour and more, as known from the prior art, to a total extraction time of less than 20 minutes and even less than 10 minutes, while still obtaining a high extraction yield. The method further allows a relatively quick separation of the inulin-enriched juice from the inulin-depleted pulp, and may yield at least the same degree of extraction and effectively even higher than achieved in known methods. Other advantages may include a higher dry matter content percentage after extraction, using less water and/or a lower water-to-solid ratio than known.

The method of the invention may also reduce the size of an extraction and juice purification plant or facility since it may produce inulin during an entire year instead of being limited to a typically 3-4 month harvesting period. A reduction of the size of the facility may reduce capital expenditures (CAPEX).

In case of drying the inulin-containing plant material to a dry matter content of at least 80 wt. %, then this may in an embodiment involve the step of sun-drying or solar-drying the inulin-containing plant material, or drying said material in an oven, or combinations of these methods. In an embodiment, when drying in an oven, the drying temperature is between 30° C. and 200° C., and preferably is between 4° and 120° C., more preferably between 5° and 100° C., even more preferably at or around 90° C. Higher temperatures may cause degradation of inulin in the plant material. Typically, drying involves the process of finding an optimum between drying time on the one hand, which should be as short as possible, and drying temperature on the other hand, which should have a level not causing degradation. In other preferred methods, drying is defined as drying up to at least 88 wt. % of dry matter, in order to obtain a microbiologically stable product, which is less prone to growth of fungi, and more preferably to at least 90-95 wt. % of dry matter. Drying to such an extent may be obtained by oven drying during a time period of from 1 to 24 hrs., more preferably from 1.5 to 6 hrs. at a temperature of 30 to 200° C.

A step of the method according to the invention provides the inulin-containing plant material or the dried inulin-containing plant material in particulate form, wherein the particles have a certain particle size distribution as claimed. Particulate in the context of the present invention means a collection of particles within the claimed range. Milling of the plant material is the preferred method, wherein the mill is configured to bring the plant material in particulate form with the claimed particle size distribution, optionally by means of a subsequent sieving step. It has turned out that particulate inulin-containing plant material with particle sizes within the claimed range performs better in terms of yield.

Although one extraction step may be sufficient in reaching some advantages of the invention, a preferred embodiment of the method is characterized in that the optionally dried particulate inulin-containing plant material is subjected to a plurality N of extraction steps. These preferred embodiments allow obtaining a greatly reduced inulin concentration in the finally obtained plant material in combination with a relatively high inulin content in the inulin containing juice.

According to yet another embodiment of the invented method, the extraction step or at least one of the plurality of extraction steps is carried out in a countercurrent (or reverse current) flow, wherein an input material is provided to flow in a direction opposite to the direction of flow of the aqueous extractant. In such an embodiment, the first extraction step n=1 (or the start of a continuous extraction process in countercurrent) is preferably carried out with an aqueous inulin extractant solution that is most concentrated of all extraction solutions (in terms of ° Brix).

A further improved method is offered by an embodiment of the method wherein the retentate obtained in an extraction step n is used as input material of a subsequent extraction step n+1, and/or the filtrate obtained in an extraction step n+1 is used as an aqueous extractant of an extraction step n. Here, n denotes a randomly selected extraction step, wherein n+1≤N. Referring to an extraction step n and a subsequent extraction step n+1 does not mean that the plurality of extraction steps N is limited to two extraction steps. The extraction steps n and n+1 may randomly be defined within a sequence of extraction steps, as long as the step n+1 succeeds the extraction step n.

In another embodiment a method is provided wherein the filtrate obtained in an extraction step n is used as aqueous extractant of a subsequent extraction step n+1. Even more preferred is an embodiment in which the filtrate obtained in a last extraction step is used as aqueous extractant of a previous extraction step.

In another preferred method, the filtrate obtained in the extraction step n+1 is used as aqueous extractant of the extraction step n.

Extraction is typically performed with water, but it may be preferred to perform the extraction or at least one of the extraction steps in the plurality N of extraction steps with an aqueous extractant solution comprising a carbohydrate solute which carbohydrate preferably comprises inulin. An aqueous solution may for instance have a carbohydrate concentration of up to 20° Brix. In this way, very high carbohydrate, preferably inulin concentrations may be achieved. In each case, the concentration of inulin in the particulate starting material should be higher than the concentration in the extractant, in order to induce extraction. Consequently, drying of the starting material to obtain a particulate starting material with such a concentration is preferred.

Concentrations of up to about 30° Brix in the filtrate have been achieved according to the invention, in particular when using dried inuline-containing plant material. Such concentrations are likely to be close to the technological limit, as an inulin solution with a concentration above 40° Brix, more preferably above 35° Brix, and most preferably above about 30° Brix can tend to crystallize and/or form a slurry, depending on the temperature. Such crystallization/slurry-forming would clearly hinder the separation between the inulin-enriched juice and the inulin-depleted pulp and may thus result in loss of inulin yield.

As a consequence of the high concentration of inulin as can be obtained directly after extraction, the subsequent known process steps of increasing the dry matter content via for example evaporation may advantageously be left out or at least significantly reduced.

It has been proven advantageous to provide an embodiment of the method wherein, in a series of extraction steps, the aqueous extractant of an extraction step n has a higher carbohydrate content measured in ° Brix than the aqueous extractant of a subsequent extraction step n+1. This may hold for one combination of an extraction step n and a subsequent extraction step n+1, but preferably holds for any combination of an extraction step n and a subsequent extraction step n+1 in an embodiment having a plurality N of extraction steps.

Other preferred embodiments of the method are provided wherein the aqueous extractant has a carbohydrate content ranging from 0° Brix to 20° Brix.

In embodiments of the method comprising a plurality N of extraction steps, the amount of extraction steps N preferably is at least 2, more preferably at least 3, even more preferably at least 4, and most preferably at least 5. The carbohydrate content of the aqueous extractant can decrease from for example about 20° Brix in the first extraction step to essentially 0° Brix in a final extraction step. Whereas a conventional inulin extraction may involve 40 extraction steps and more, the number of extraction steps in the invented method according to some embodiments is significantly lower than that, preferably at most 10, more preferably at most 7, and most preferably at most 5.

It is possible according to the invention to provide variations in the extraction step, or in some or each extraction step in a multistep embodiment. It is for instance possible to use aqueous inulin extractant solutions that originate from elsewhere in one or more of the extraction steps, to optimize duration of an extraction step, to optimize temperature and/or pH in an extraction step, and/or to vary the number of extraction steps used in the embodied method.

In useful embodiments of the invented method, the temperature of the extractant in the extraction step or in at least one of the plurality of extraction steps is provided between 55° C. and 95° C., more preferably between 60° C. or 65° C. and 75° C. In an embodiment involving a plurality N of extraction steps, at least two of the extraction steps may be carried out at a different temperature. Increased temperatures have been shown to result in a faster extraction compared to extraction at lower temperatures, and in higher carbohydrate contents in ° Brix. Conducting an extraction step at a temperature higher than 95° C. may not be advisable, since the structure of the plant material may be broken down at such temperatures.

The duration of an extraction step may be varied. In a preferred embodiment of the method, the extraction step or at least one of the plurality N of extraction steps, and preferably all of the extraction steps, have a short duration per extraction step of between 10 and 300 seconds (sec), preferably of between 30 and 150 sec, even more preferably of between 50 and 70 sec. In a preferred embodiment the plurality N of extraction steps have a total duration of at most 20 minutes (min), preferably of at most 15 or 10 min. It is observed in relation hereto that the duration of the different extraction steps does not need to be the same. For instance, when performing six extraction steps, the duration could be three times 1 minute, twice 2 minutes and once 4 minutes.

In a further embodiment, a separation step is carried out after each extraction step in a method comprising a plurality of extraction steps. In one embodiment, the separation step comprises removing the extractant liquid from a bath in which the plant material is placed. The separation may preferably be carried out in a different kind of equipment than conventionally used, and in that case primarily differs from the conventional separation means by the application of an external force in addition to gravity. The external force may comprise applying a partial or substantially full vacuum. Such a vacuum may for instance range from 50 to 700 mbar, more preferably from 100 to 600, and even more preferably from 300 to 500 mbar. A practical embodiment comprises vacuum filtration. Separation in a centrifuge is however also possible, but less preferred, inter alia because of higher costs.

A particularly preferred embodiment of the method is provided wherein both the extraction step- or at least one of the plurality N of extraction steps- and the step of separating the filtrate from the retentate are carried out by a vacuum band filter and/or rotating filter and/or centrifuge. In a preferred embodiment of the invention, at least two or even all of the plurality N of extraction steps are carried out by means of one band filter, rotating filter and/or centrifuge, which then all comprise a number of alternating sections, configured for mixing and separating, and allowing for counter current extraction.

The countercurrent extraction process entails that the filtrate juice obtained in an extraction step b (wherein a plant material sample is extracted for the second time) is led to an extraction step a, in which it is used for extraction of a plant material sample that has not been extracted before. The filtrate juice used in step b is enriched juice, as it has been obtained from three earlier extraction steps c, d, and e, in which plant material, such as chicory, samples were extracted for a third, fourth and fifth time respectively.

While full countercurrent extraction is considered most beneficial, variations hereto are not excluded. For instance, the plant material sample could stay in place (such as in step c), and be extracted several times with different extractant juices. Furthermore, one could use plant material of different sources for different extraction steps.

The inventors have found that the degree of extraction of inulin using the invented method can be at least as high as, or even higher than in conventional methods. This beneficial effect is particularly pronounced when comparing methods that use the same extraction time, where the degree of extraction can be higher in the invented method than as obtainable in conventional methods.

The observed higher degree of extraction may also imply that the filtrate contains more inulin with a higher DP on average. This expectation is based on the understanding that low DP inulin is more soluble in water and will be extracted earlier. Hence, when the extraction degree is higher, the extra inulin extracted is most likely inulin with a higher DP or at least inulin with a high DP fraction. It is possible that the extraction with an aqueous solution having a higher Brix value contributes thereto. Also, the method of the invention can lead to a better extraction (i.e., a better penetration of water into the plant material, such as chicory root) so that more of the higher DP inulin chains may get dissolved in this process.

The final filtrate may be characterized by means of the ratio between the somewhat longer chains (having degree of polymerization of 5 or higher, 'DP5+') and the amount of impurities. The latter include anions, cations, smaller sugars (i.e. fructose, glucose, and sucrose) and amino acids. It was found that this ratio may be increased in some embodiments compared to typical ratios obtained in a conventional extraction.

The pH of the aqueous extractant may have an influence on the extraction step carried out within the context of the invented method. In one embodiment, one or more steps of the extraction process may be carried out at a pH of between 3 and 5, and more preferably around 4-4.2. Preferably, this is the final extraction step. Conventionally, such a rather low pH value had to be avoided in extraction steps, largely to prevent degradation of inulin by hydrolysis. In the present embodiment of the invented method, however, hydrolysis can be made to be much less significant, as significantly shorter extraction times compared to state of the art methods can be employed.

In another embodiment, a flocculation step may be added to the invented method, which involves adding a flocculation agent to the extractant, for forming at least one floc with at least one contaminant of the extractant; and discharging the floc after the floc formation. The flocculation steps are preferably carried out in a final extraction step. In addition, dried inulin-containing plant material in particulate form, wherein the particles have a particle size as claimed, may be effective as a filter means used in the flocculation step.

The filtrate juice obtainable from the invented method can be rather clear, preferably from the beginning, and hence undesired proteins are thought to remain in the inulin-depleted pulp retentate, without requiring diatomaceous earth for instance to prevent filter clogging. An additional advantage hereof is that the pulp may be richer in nutrients. This is relevant as the pulp may be used as animal feed.

A useful embodiment of the method in accordance with the invention is characterized in that the plurality of extraction steps is configured for increasing the carbohydrate content of the inulin-enriched juice over the course of the extraction steps, in order to obtain an inulin-enriched juice in a final extraction step with a carbohydrate content of at least 25° Brix, preferably of at least 26 or 28° Brix, more preferably of at least 29° Brix.

In yet another embodiment of the method, the plurality of extraction steps is configured for obtaining an inulin-depleted pulp with an overall degree of inulin depletion of at least 80 or 90%, more preferably at least 95% of the total initial weight of inulin in the plant material.

EXAMPLES AND COMPARATIVE EXAMPLES

The following examples are provided to further illustrate the present invention and are not to be construed as limiting the invention in any manner. In the following examples, inulin-containing plant material is processed according to methods according to the invention and, in comparative examples, compared to material which is not processed or is not processed according to the invention.

Analysis

HPLC analysis was carried out by providing a set of two columns of 30 cm long and 7.8 mm diameter each, connected in series and heated to 72±2° C., loaded with an Aminex HPX-87K ion-exclusion resin in K$^+$ form, provided with an HPLC pump and an auto sampler equipped with a cooling system at 4° C. The set of columns was used with a KOH eluent solution with a pH of between 9.5-9.6 at a flow rate of 0.50 cm$^3$/min. In each of the following experiments of this example, the sample size was set at 100 µL. The columns were first calibrated with stock solutions of different sugars and fructooligosaccharides, i.e. solutions with fructose (F), glucose (G), sucrose (GF) and a plurality of fructooligosaccharide GF$_n$ solutions with known average degrees of polymerization n. During this calibration, stock solutions were both injected undiluted in order to determine the peak position in the chromatogram, as well as diluted (5, 10, 15 and 30 grams of stock per grams of solution) in order to determine the response factors, allowing the area under the peak to be used for quantitative analysis.

One way of expressing the quantitative results of the HPLC measurement on a sample is in the form 'grams per 100 grams ° Brix', i.e. the result is expressed as weight percentage of the total weight attributable to compounds contributing to ° Brix. Another way of expressing the quantitative results is as weight percentage of the total amount of soluble carbohydrates in the sample, typically named 'grams per 100 grams of carbohydrate'.

In the analysis of the chromatograms, it was observed that the HPLC columns were unable to separate inulin (i.e. including fructooligosaccharides) with a degree of polymerization DP of 5 or higher from each other, implying that inulin (including fructooligosaccharides) with a degree of polymerization of 5 or higher form a single peak (typically named 'DP5+'). This is well-known in HPLC analyses of inulin.

Dry matter content was assessed using ISO 6496 (1999) without preliminary conditioning, with, in all of the below cases, a drying procedure of 4 hours at 105° C., which is within the margin defined in the standard. The dry matter content, deduced from the moisture and other volatile matter content (weight) $w_1$ by regarding all of the matter not being moisture or volatile as dry matter.

Particle size distribution measurements on previously dried samples were carried out according to ISO 13320: 2009, in triplo with a Malvern Mastersizer 2000 and a Scirocco 2000 dispersion module with a dispersion pressure of 1 bar, interpreted according to the Fraunhofer model and averaged.

Particle size distribution measurements on previously not-dried/fresh samples were carried out by image analysis, according to the following method. A Morphologi G3 is used having episcopic and diascopic illumination for static dispersed particles on a precision XY stage. A 5 Mega pixel camera collects images of individual particles in a size range of 0.5-3000 µm and even smaller than 0.5 µm and larger than 3000 µm. All individual images of the particles are analyzed by software resulting in statistically significant particle size and shape information. Particle size and particle size distribution are determined, and multiple shape parameters are calculated for each individual particle and shape distributions generated. The basic morphological dimensions, such as area in pixels and micrometers, major axis, length, width, maximum distance, perimeter are the basis for different shape distributions. The applied morphological parameters for the shape distribution is the CE diameter defined as the diameter of a circle with the same area as the projected area of the particle image.

The principal result of imaging is a number based Particle Size Distribution, where the size of the particles is related to their equivalent circular diameter. Quantitative particle shape distributions are defined by shape descriptors, derived from a ratio of two particle size dimensions.

The following equipment and methodology was used. The samples are characterized with the Malvern Morphologi G3SE with a Nikon CFI Brightfield/Darkfield inspection microscope (Eclips L200ND) and a Baumer 5 M pixels CCD digital color camera. The microscopic imaging uses four calibration gratings of different pitches covering the full range of the instrument. From a sample jar, a small chunk of frozen sample was removed and placed in a beaker. Water was added to the beaker with sample and the sample was stirred till the large chunk of sample was completely unfrozen and dispersed. From the dispersion, 3 ml was removed and placed on the glass plate of the microscope and analyzed. The above-listed procedure is performed three times. To achieve an accurate focus across the entire body of small and large three-dimensional particles, up to 4 images at different focal points of a particle are taken and then merged to provide a single composed image.

In order to determine the concentration of dissolved substances in aqueous solution, a refractometer was used which is calibrated on a daily basis with water (0° Brix) and on a monthly basis with a sucrose solution with a carbohydrate content, based on sucrose, of either 15° Brix or 35° Brix.

Experiment 1: Extraction with Different Starting Materials

A first set of samples was prepared from *Cichorium intybus* plants of which the roots were sliced and dried to a dry matter amount suitable for conservation, corresponding to a dry matter content according to ISO 6496 (1999) as specified above of 88.0%$_w$. The dried sliced roots were subsequently used as-is for comparison or ground to a particulate starting material and sieved with sieves with a specific pore size to obtain samples according to the invention, as well as for a comparative example with a powder with a particle size distribution not according to the invention. The samples are summarized in Table 1. In this respect, the sieve range of powder is defined by the sieves used to obtain the starting material. For example, a sieve range of powder of 1.0 mm-2.0 mm implies that the sample consists of starting material which was able to pass a sieve with a pore size of 2.0 mm, but was not able to pass a sieve with a pore size of 1.0 mm.

TABLE 1

| | Set-up | | |
|---|---|---|---|
| Sample | Shape | Sieve range of powder | $T_{extr}$ [° C.] |
| Example 1 | Particulate | <0.63 mm | 65 |
| Example 2 | Particulate | 1.0-2.0 mm | 65 |
| Comparative Example A | Particulate | 2.0-4.0 mm | 65 |
| Comparative Example B | Dried sliced roots | Not applicable | 65 |
| Comparative Example C | Dried sliced roots | Not applicable | 65 |
| Example 3 | Particulate | <0.63 mm | 75 |
| Example 4 | Particulate | 0.63-1.0 mm | 75 |
| Example 5 | Particulate | 1.0-2.0 mm | 75 |

TABLE 1-continued

| | Set-up | | |
|---|---|---|---|
| Sample | Shape | Sieve range of powder | $T_{extr}$ [° C.] |
| Comparative Example D | Particulate | 2.0-4.0 mm | 75 |
| Comparative Example E | Dried sliced roots | Not applicable | 75 |
| Comparative Example F | Dried sliced roots | Not applicable | 75 |

15 grams of each of the samples were brought in contact with 100 grams of water. During extraction, the water was kept at a temperature $T_{extr}$ as listed in Table 1 and a refractometer was used in order to determine the concentration of dissolved substances in the juice after 2.5 minutes, 5 minutes and continued 5-minute intervals until reaching 1 h.

Figure 1:
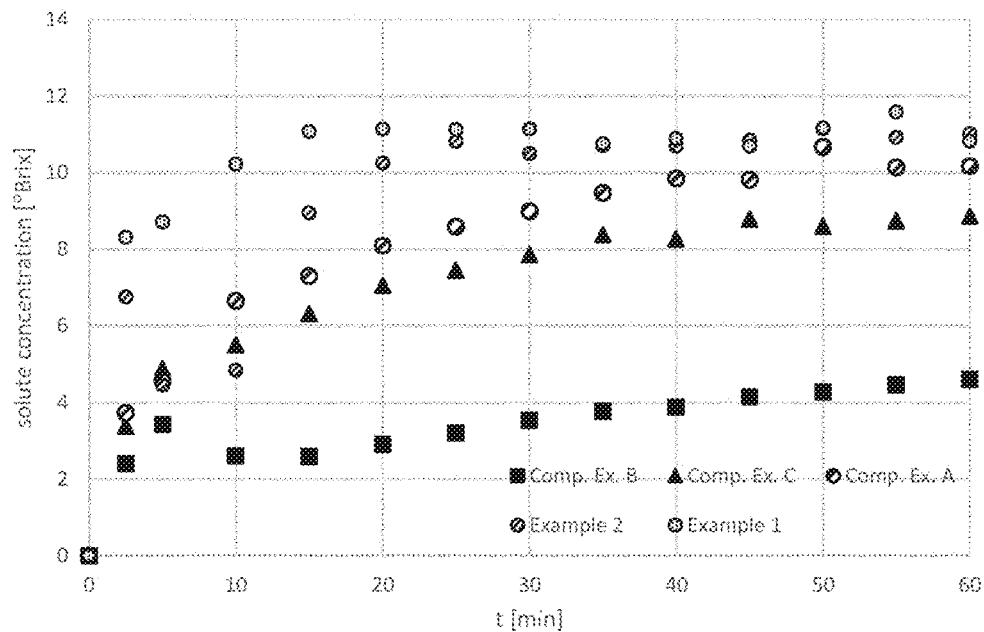
FIGS. 1-8 plot solute concentration [° Brix] over time of various working examples of the present invention.
Figure 2:
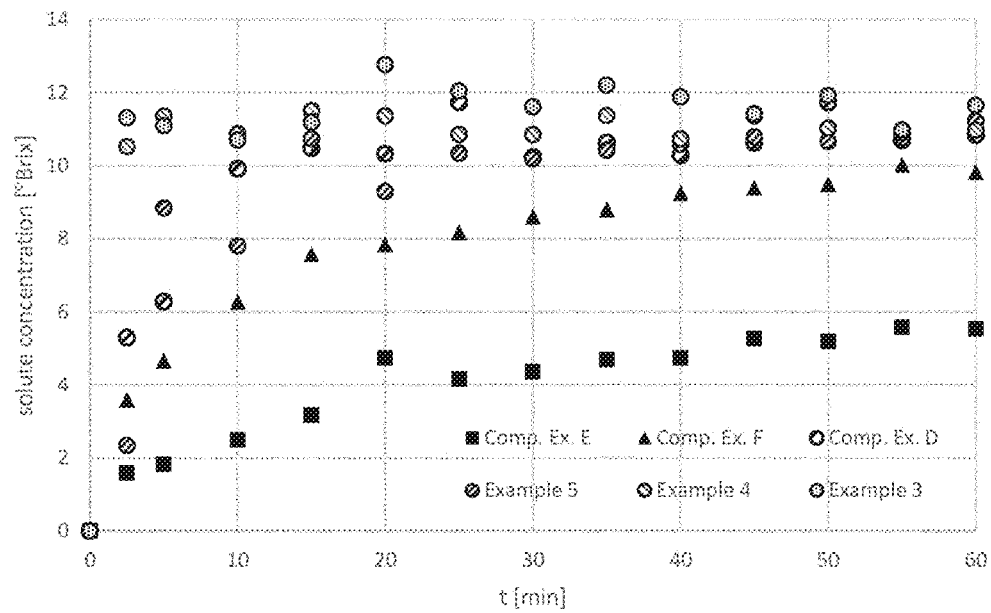

FIGS. 1 and 2 demonstrate a faster rate of extraction and higher final solute concentration rates after 1 h when using dried powders from *Cichorium intybus* plants roots which are sieved with sieves with a pore size of 2.0 mm compared to dried powders with a larger pore size, as well as dried and sliced roots.

Experiment 2: Extraction with Different Starting Materials and Different Extraction Periods Various *Cichorium intybus* plant root samples were prepared from the same plant material as mentioned in Experiment 1 in a way as summarized in Table 2. Extraction was carried out in an otherwise similar way as in Experiment 1, however this experiment additionally comprises experiments which were completed after 20 minutes (Examples 6A and 8A).

TABLE 2

| | Set-up | | |
|---|---|---|---|
| Sample | Shape | Sieve range of powder | $T_{extr}$ [° C.] |
| Example 6 | Particulate | <1.0 mm | 65 |
| Example 6A | Particulate | <1.0 mm | 65 |
| Example 7 | Particulate | 1.0-2.0 mm | 65 |
| Comparative Example G | Particulate | 2.0-4.0 mm | 65 |
| Example 8 | Particulate | <1.0 mm | 75 |
| Example 8A | Particulate | <1.0 mm | 75 |
| Example 9 | Particulate | 1.0-2.0 mm | 75 |
| Comparative Example H | Particulate | 2.0-4.0 mm | 75 |

The product of the experiments was separated using vacuum filtration with a vacuum of 800 mbar after extraction into a filtrate, which was analyzed by HPLC, and a retentate. The retentate was extracted for 60 minutes with water at a temperature of 75° C. in order to simulate complete extraction, and again separated into a retentate, which was discarded, and a filtrate, which was analyzed by HPLC.

Table 3 provides an overview of the solute concentration of the extract (from the extraction) and the retentate (deduced from the extract of the extraction simulating complete extraction), as well as the amount of fructooligosaccharides with a degree of polymerization of 5 or higher.

TABLE 3

Solute concentration and degree of polymerization of obtained extracts

| | [solute]$_{extr}$ [° Brix] | [solute]$_{retent}$ [° Brix] | DP5+ [g/100 g ° Brix] |
|---|---|---|---|
| Example 6 | 10.01 | 1.52 | 81.3 |
| Example 6A | 10.30 | 1.60 | 80.6 |
| Example 7 | 9.38 | 1.78 | 79.4 |
| Comparative Example G | 8.43 | 1.70 | 77.7 |
| Example 8 | 10.30 | 1.52 | 81.9 |
| Example 8A | 10.66 | 1.48 | 81.5 |
| Example 9 | 10.00 | 1.60 | 81.8 |
| Comparative Example H | 10.05 | 1.86 | 77.6 |

The results in this table demonstrate that it is possible to extract more inulin with a relatively high degree of polymerization within a shorter period of time from the samples according to the invention, in which extraction with smaller particles leads to a higher yield in general, as well as in terms of chains with a DP of 5 or more. Furthermore, it is clear that the procedure results in a reduction of the amount of soluble carbohydrates present in the retentate after extraction.

Figure 3:
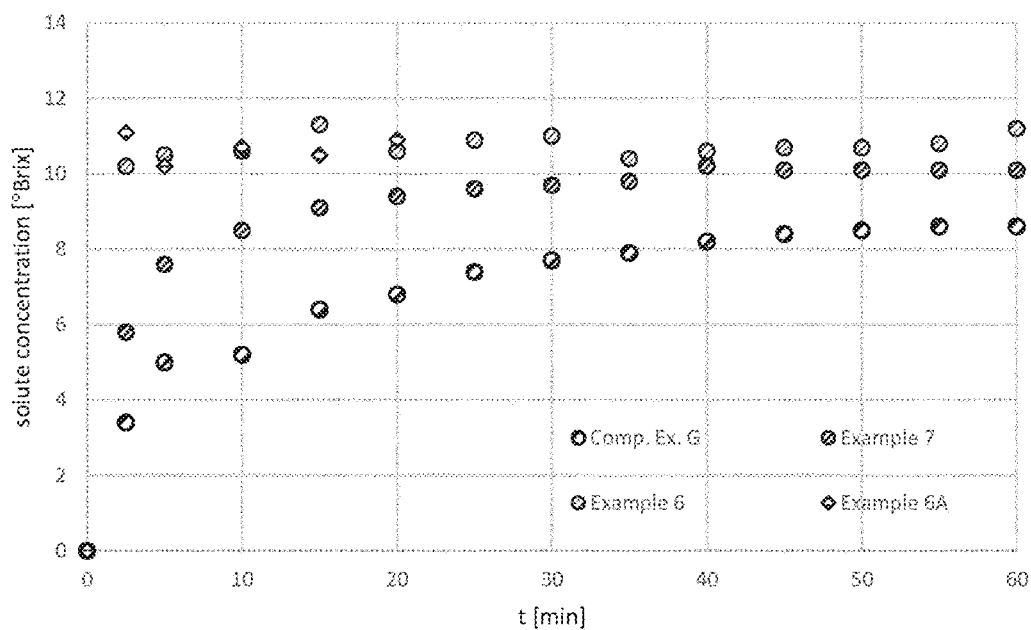
Figure 4:
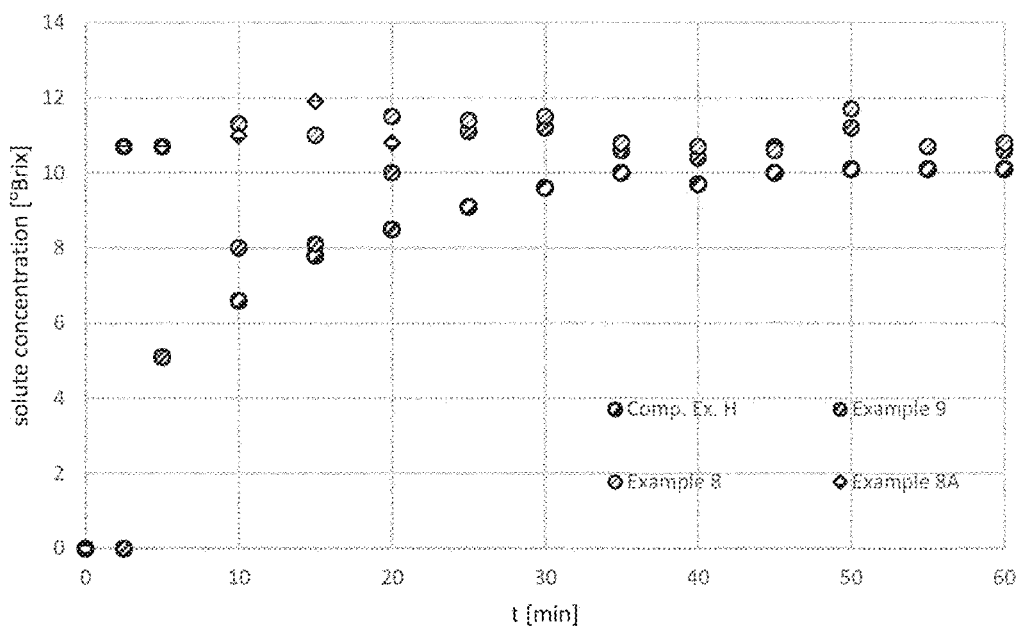

FIGS. 3 and 4 again demonstrate a faster rate of extraction and higher final solute concentration rates after 1 h when using dried powders from *Cichorium intybus* plants roots which have a particle size lower than 4.0 mm.

Experiment 3: Extraction with Extractant Having High Carbohydrate Content

Various *Cichorium intybus* plant root samples were prepared from the same plant material as mentioned in Experiment 1 in a way summarized in Table 4. Extraction and complete extraction simulation was carried out in the same way as described in Experiment 2, however the extractant used was water mixed with spray-dried inulin from *Cichorium intybus* to obtain an aqueous extractant with a starting carbohydrate content of 20° Brix, as confirmed with the refractometer.

TABLE 4

Set-up

| Sample | Shape | Sieve range of powder | $T_{extr}$ [° C.] |
|---|---|---|---|
| Example 10 | Particulate | <1.0 mm | 65 |
| Example 11 | Particulate | 1.0-2.0 mm | 65 |
| Comparative Example I | Particulate | 2.0-4.0 mm | 65 |
| Example 12 | Particulate | <1.0 mm | 75 |
| Example 13 | Particulate | 1.0-2.0 mm | 75 |
| Comparative Example J | Particulate | 2.0-4.0 mm | 75 |

Figure 5:
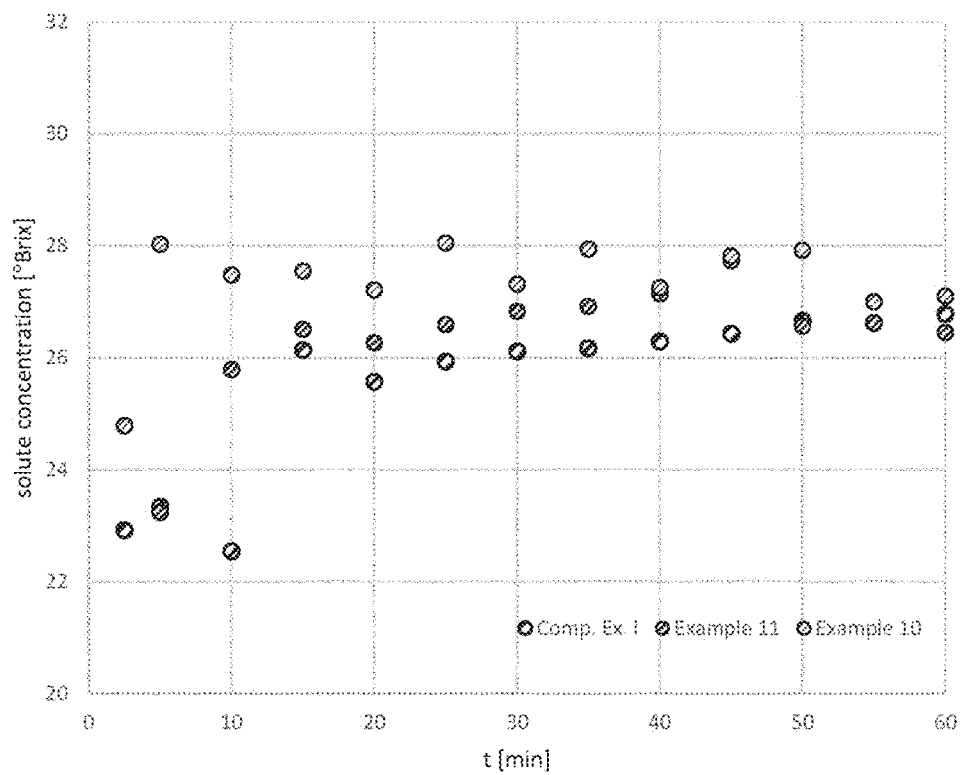
Figure 6:
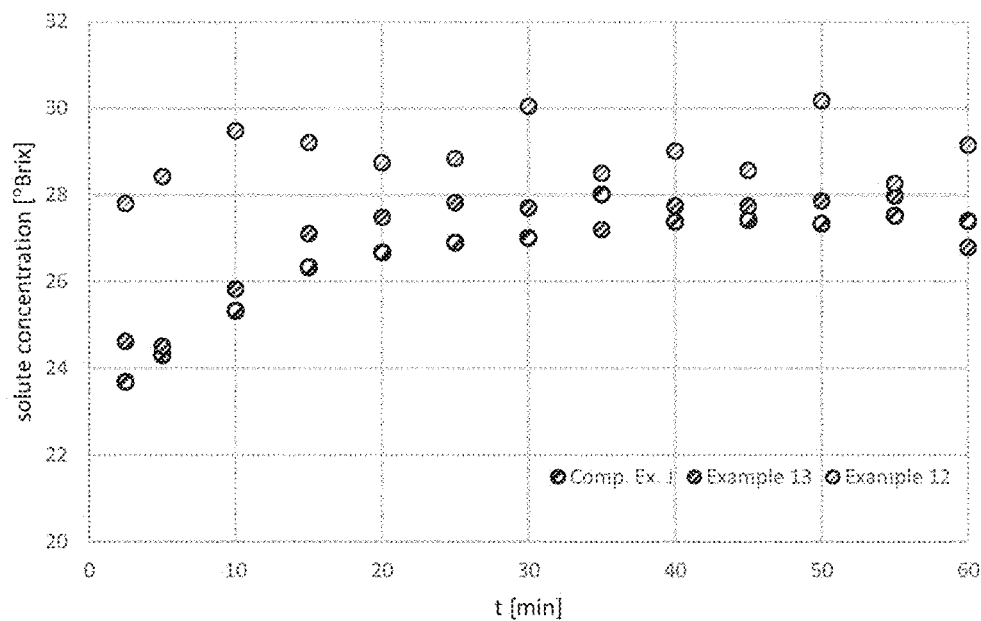

The carbohydrate contents, measured with the refractometer, are plotted in FIGS. 5 and 6 for extraction at 65° C. and 75° C. respectively. These figures demonstrate the possibility of obtaining a juice with a high solute concentration expressed in ° Brix.

Experiment 4: Countercurrent Simulation with Smaller Fraction for Different

Multiple extractants were provided, starting from water as an aqueous extractant of 0° Brix, and by mixing an amount of spray dried inulin with water in order to obtain further aqueous extractants with carbohydrate contents of 20° Brix, 15° Brix, 10° Brix, and 5° Brix, respectively. Each of the extractants comprises an amount of sulfuric acid 10% w in order to bring the pH of the extractant to 5.5.

Various *Cichorium intybus* plant root samples were prepared from plants of which the roots were sliced subsequently dried. The dry matter content of the starting material was confirmed to be 88.0% w (ISO 6496 (1999) as specified above). The sliced and dried roots were subsequently ground to a particulate starting material and sieved with sieves with a specific pore size as summarized in Table 7.

TABLE 7

Set-up

| Sample | Shape | Sieve range of powder | $t_{extr}$ [sec] |
|---|---|---|---|
| Example 14 | Particulate | <1.0 mm | 60 |
| Example 15 | Particulate | <1.0 mm | 150 |

Countercurrent extraction was simulated by carrying out the following steps: subjecting 15 grams of one the particulate (starting) material from one sample at a time with 100 grams of the prepared 20° Brix extractant for text seconds, and filtered by vacuum filtration in order to obtain a first filtrate and first retentate. As a second step, the first retentate was contacted with an amount of the prepared 15° Brix extractant for $t_{extr}$ seconds, totaling with the first retentate to 115 grams, and filtered by vacuum filtration in order to obtain a second filtrate and second retentate. As a third step, the second retentate was contacted with an amount of the prepared 10° Brix extractant for $t_{extr}$ seconds, totaling with the second retentate to 115 grams, and filtered by vacuum filtration in order to obtain a third filtrate and third retentate. As a fourth step, the third retentate was contacted with an amount of the prepared 5° Brix extractant for $t_{extr}$ seconds, totaling with the third retentate to 115 grams, and filtered by vacuum filtration in order to obtain a fourth filtrate and fourth retentate. As a fifth step, the fourth retentate was contacted with an amount of water (0° Brix) for $t_{extr}$ seconds, totaling with the fourth retentate to 115 grams, and filtered by vacuum filtration in order to obtain a final filtrate and final retentate. During each of these simulations, the extraction baths had a bath temperature of 65° C.

After each of the simulations, the concentration of dissolved substances of the filtrate was measured with a refractometer according to the aforementioned procedure. Furthermore, 60 grams of the final retentate of each of the experiments was extracted with 300 grams of water for 60 minutes at a temperature of 75° C. in order to simulate complete extraction, and filtered by vacuum filtration. The amount of dissolved substances in this filtrate (representative for the amount still present after completion of the simulation) was determined with the refractometer. The results are listed in Table 8.

TABLE 8

Solute concentration

| Step # | Example 14 [solute] [° Brix] | Example 15 [solute] [° Brix] |
|---|---|---|
| 1 (20° Brix) | 27.3 | 26.7 |
| 2 (15° Brix) | 19.5 | 20.1 |
| 3 (10° Brix) | 13.1 | 13.8 |

TABLE 8-continued

| | Solute concentration | |
|---|---|---|
| Step # | Example 14 [solute] [° Brix] | Example 15 [solute] [° Brix] |
| 4 (5° Brix) | 7.1 | 7.3 |
| 5 (water) | 1.8 | 1.7 |
| Retentate | 0.30 | 0.40 |

The results in this table demonstrate that the differences in extraction quality between an extraction time of 60 and 150 seconds are within the limit of significance at an extraction bath temperature of 65° C. Countercurrent extraction with 5 steps of 60 seconds is sufficient to obtain a high yield of good quality.

Experiment 5: Countercurrent Simulation with Smaller Fractions

Multiple extractants were provided, starting from water as an aqueous extractant of 0° Brix, and by mixing an amount of spray dried inulin with water in order to obtain further aqueous extractants with carbohydrate contents of 20° Brix, 15° Brix, 10° Brix, and 5° Brix, respectively. Each of the extractants comprises an amount of sulfuric acid 10% w in order to bring the pH of the extractant to 5.5.

Various *Cichorium intybus* plant root samples were prepared from plants of which the roots were sliced and dried. The dry matter content of the starting material was confirmed to be 91.9% w (ISO 6496 (1999) as specified above). The dried material was subsequently ground to a particulate starting material and sieved with sieves with a specific pore size. The samples are summarized in Table 9.

TABLE 9

| | Set-up | |
|---|---|---|
| Sample | Shape | Sieve range of powder |
| Example 16 | Particulate | <0.20 mm |
| Example 17 | Particulate | 0.20-0.63 mm |
| Example 18 | Particulate | 0.63-1.0 mm |

Countercurrent extraction was simulated by carrying out the following steps subjecting 15 grams of the particulate (starting) material from one sample at a time with 100 grams of the prepared 20° Brix extractant for 60 seconds, and filtered by vacuum filtration in order to obtain a first filtrate and first retentate. As a second step, the first retentate was contacted with an amount of the prepared 15° Brix extractant for 60 seconds, totaling with the first retentate to 115 grams, and filtered by vacuum filtration in order to obtain a second filtrate and second retentate. As a third step, the second retentate was contacted with an amount of the prepared 10° Brix extractant for 60 seconds, totaling with the second retentate to 115 grams, and filtered by vacuum filtration in order to obtain a third filtrate and third retentate. As a fourth step, the third retentate was contacted with an amount of the prepared 5° Brix extractant for 60 seconds, totaling with the third retentate to 115 grams, and filtered by vacuum filtration in order to obtain a fourth filtrate and fourth retentate. As a fifth step, the fourth retentate was contacted with an amount of water (0° Brix) for 60 seconds, totaling with the fourth retentate to 115 grams, and filtered by vacuum filtration in order to obtain a final filtrate and final retentate. During each of these simulations, the extraction baths had a bath temperature of 65° C.

After each of the simulations, the concentration of dissolved substances of the filtrate was measured with a refractometer according to the aforementioned procedure, and the time necessary for the filtration to complete was recorded. Furthermore, 60 grams of the final retentate of each of the experiments was extracted with 300 grams of water for 60 minutes at a temperature of 75° C. in order to simulate complete extraction, and filtered by vacuum filtration. The amount of dissolved substances in this filtrate (representative for the amount still present after completion of the simulation) was determined with the refractometer. The results are listed in Table 10.

TABLE 10

| | Solute concentration and filtration times | | | | | |
|---|---|---|---|---|---|---|
| | Example 16 | | Example 17 | | Example 18 | |
| Step # | [solute] [°Brix] | $t_{filtr}$ [sec] | [solute] [°Brix] | $t_{filtr}$ [sec] | [solute] [°Brix] | $t_{filtr}$ [sec] |
| 1 (20 °Brix) | 27.3 | 360 | 26.2 | 43 | 25.5 | 52 |
| 2 (15 °Brix) | 20.1 | 92 | 19.1 | 152 | 19.2 | 77 |
| 3 (10 °Brix) | 13.7 | 331 | 14.0 | 49 | 14.9 | 74 |
| 4 (5 °Brix) | 8.1 | 89 | 7.0 | 40 | 10.2 | 65 |
| 5 (water) | 2.0 | 73 | 1.5 | 115 | 4.3 | 130 |
| Retentate | 0.93 | | 0.36 | | 0.32 | |

The results in this table demonstrate an increased amount of substances dissolved in the extract with a starting material with a relatively small particle size, but also demonstrates that particles with a size smaller than 0.20 mm result in a filtration with a duration less suitable for practical implementation.

Experiment 6: Comparison of Sliced Roots with Particulate Matter Based Thereon

*Cichorium intybus* plant roots were sliced, and oven dried overnight at 105° C., up to a dry matter content of 97.5% w (as confirmed using ISO 6496 as specified above). Part of the dried material was ground to a particulate starting material and sieved with sieves with a specific pore size. The samples are summarized in Table 11.

TABLE 11

| | Set-up | |
|---|---|---|
| Sample | Shape | Sieve range of powder |
| Comparative example K | Dried sliced roots | Not applicable |
| Example 19 | Particulate | <1.0 mm |
| Example 20 | Particulate | 1.0-2.0 mm |

The particle size distribution of sample 19 was measured and is summarized in Table 12. This measurement also demonstrated that the sample had a $D_5$ of 63 μm, a $D_{50}$ of 619 μm and a $D_{95}$ of 1269 μm.

TABLE 12

Particle size distribution

| Size [μm] | Volume over [%] |
|---|---|
| 1 | 100.00 |
| 5 | 100.00 |
| 10 | 99.47 |
| 15 | 98.89 |
| 20 | 98.32 |
| 25 | 97.79 |
| 30 | 97.32 |
| 40 | 96.53 |
| 50 | 95.85 |
| 75 | 94.26 |
| 100 | 92.74 |
| 125 | 91.46 |
| 150 | 90.46 |
| 175 | 89.67 |
| 200 | 88.97 |
| 250 | 87.33 |
| 300 | 84.82 |
| 350 | 81.18 |
| 400 | 76.49 |
| 450 | 70.98 |
| 500 | 64.95 |
| 600 | 52.38 |
| 700 | 40.46 |
| 800 | 30.12 |
| 900 | 21.70 |
| 1000 | 15.17 |
| 1100 | 10.30 |
| 1200 | 6.79 |
| 1300 | 4.34 |
| 1400 | 2.69 |
| 1500 | 1.60 |
| 1600 | 0.90 |
| 1700 | 0.48 |
| 1800 | 0.23 |
| 1900 | 0.09 |
| 2000 | 0.00 |

15 grams of each of the samples were brought in contact with 100 grams of water. During extraction, the water was kept at a temperature of 65° C. and a refractometer, calibrated with a plurality of aqueous solutions with a known carbohydrate content, was used in order to determine the concentration of dissolved substances in the juice after 5 minutes, which are summarized in Table 13.

The filtrate of the extraction was analyzed by HPLC, for which the measured amounts of DP5+, expressed in grams per 100 g° Brix are also listed in Table 13.

TABLE 13

| | Solute concentration | |
|---|---|---|
| Sample | [solute] [° Brix] | DP5+ [g/100 g ° Brix] |
| Comparative example K | 3.8 | 84.3 |
| Example 19 | 11.0 | 87.5 |
| Example 20 | 7.7 | 85.6 |

These results demonstrate that it is possible to arrive at a higher solute concentration within the same period of time for particles with a size below 2.0 mm, and especially below 1.0 mm, in comparison to sliced material from the same plant.

Experiment 7: Example 21, Dandelion Extraction

Roots of *Taraxacum officinale* (dandelion) were harvested in October and oven dried for 12 hours at 60° C. after which they were ground to a particulate material. The particulate material was sieved with a sieve with a pore size of 1.0 mm, in order to obtain a starting material out of material which passed through the sieve.

Figure 7:
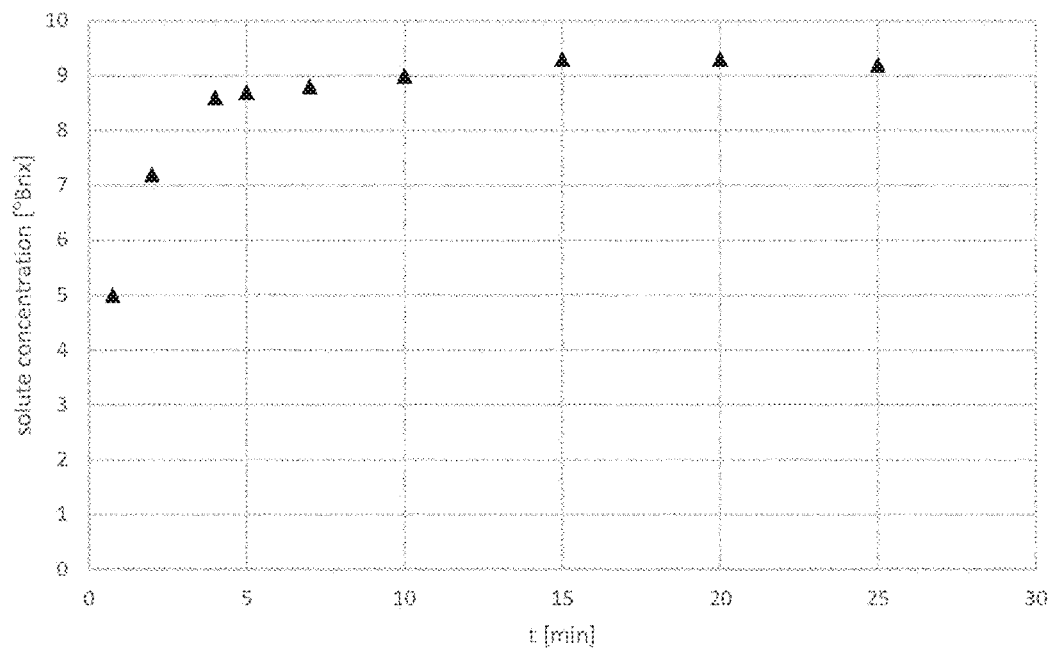

15 grams of the sieved sample was brought in contact with 100 grams of water. During extraction, the water was kept at a temperature of 65° C. and a refractometer was used in order to determine the concentration of dissolved substances in the juice over continued 5-minute intervals until reaching plateau (i.e. no different value in three consecutive measurements). FIG. 7 shows a graph of the increase in carbohydrate content measured over time.

The filtrate of the extraction was analyzed by HPLC. In a first aspect, this analysis discloses that the quantity of inulin in the filtrate was 89.8 grams per 100 grams carbohydrate, demonstrating that it is possible to extract high amounts of inulin from other materials than *Cichorium intybus* in a particulate form as well. In a second aspect, the inulin extracted has a DP5+ fraction of 69.2 grams per 100 grams ° Brix, which comes down to 79.0 grams per 100 grams carbohydrate. The average DP of the filtrate was determined to be 10.4 by AOAC Method 997.08.

These results demonstrate that other particulate starting materials than *Cichorium intybus*, such as for instance *Taraxacum officinale*, can favourably be used in the method of the present invention as evidenced by the swift achievement of a high yield and by the high degree of polymerization (DP) of the inulin obtained.

Experiment 8

*Cichorium intybus* plant roots were sliced and dried to a dry matter content, according to ISO 6496 (1999) as specified above, of 88.0%$_w$. The sliced and dried material was ground to a particulate starting material and sieved with sieves with a specific pore size.

With the fractions obtained, mixtures were prepared according to Table 14, which lists the weight percentage of each of the fractions in the compositions.

TABLE 14

| | Set-up | | | | | | |
|---|---|---|---|---|---|---|---|
| Size [mm] | 0-0.2 | 0.2-1.0 | 1.0-2.0 | 2.0-4.0 | 2.0-3.15 | 3.15-4.0 | 4.0-5.6 |
| Example 22 | 10% | 90% | | | | | |
| Example 23 | 10% | 70% | 20% | | | | |
| Example 24 | 10% | 70% | | 20% | | | |
| Example 25 | 10% | 70% | | | 20% | | |
| Example 26 | 10% | 70% | | | | | 20% |

TABLE 14-continued

| | Set-up | | | | | | |
|---|---|---|---|---|---|---|---|
| Size [mm] | 0-0.2 | 0.2-1.0 | 1.0-2.0 | 2.0-4.0 | 2.0-3.15 | 3.15-4.0 | 4.0-5.6 |
| Comparative example L | 10% | 70% | | | | | 20% |
| Comparative example M | 10% | 50% | | | | | 40% |

45 grams of each of the mixtures according to the Examples listed were extracted in 300 grams of water. A refractometer was used in order to determine the concentration of dissolved substances in the juice after 2.5 minutes and continued 2.5-minute intervals until reaching 20 minutes, and a last measurement after 1 h.

Figure 8:
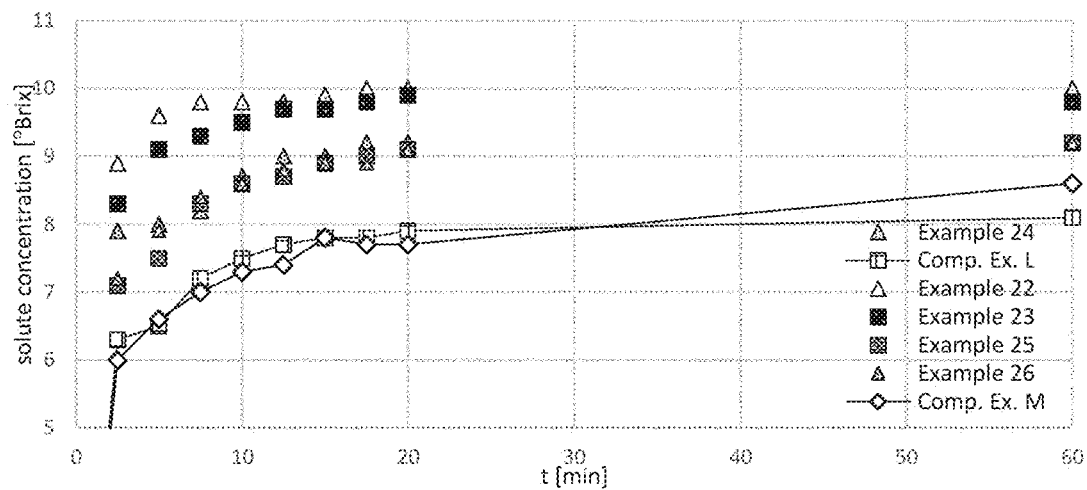
Figure 9:
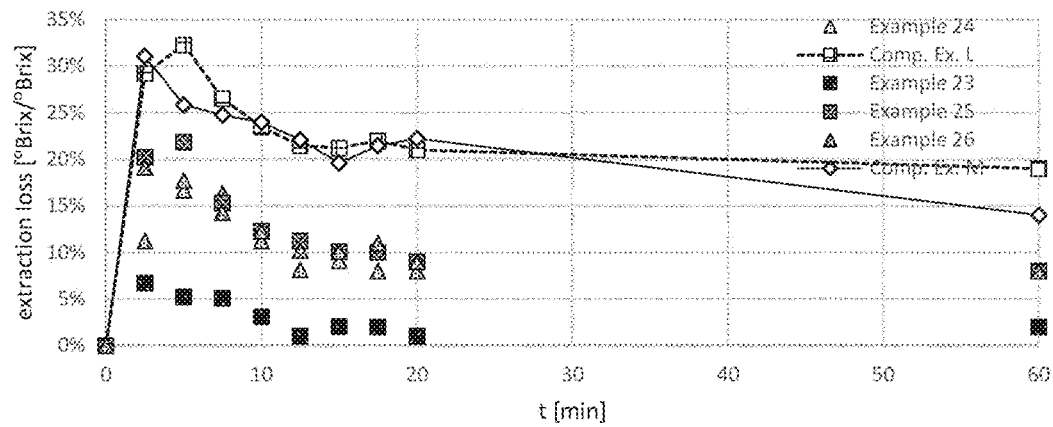
FIG. 9 plots extraction loss (° Brix/Brix) over time in accordance with a working example of the present invention'

FIG. 8 is a plot of the concentration of dissolved substances in the juice over time of each of the Examples of this Experiment. FIG. 9 shows the same data but differently expressed, namely, each time as the difference to Example 22, the difference being called 'extraction loss'. This demonstrates that compositions with a significant amount of particles with a size above 4 mm result in a slower extraction, in particular during the initial 10 minutes of extraction, and moreover lead to a lower ultimate degree of extraction. Within the range with particles with a size below 4 mm, compositions with smaller particles exhibit increased extraction while surprisingly still showing good filterability.

Experiment 9

Figure 10:
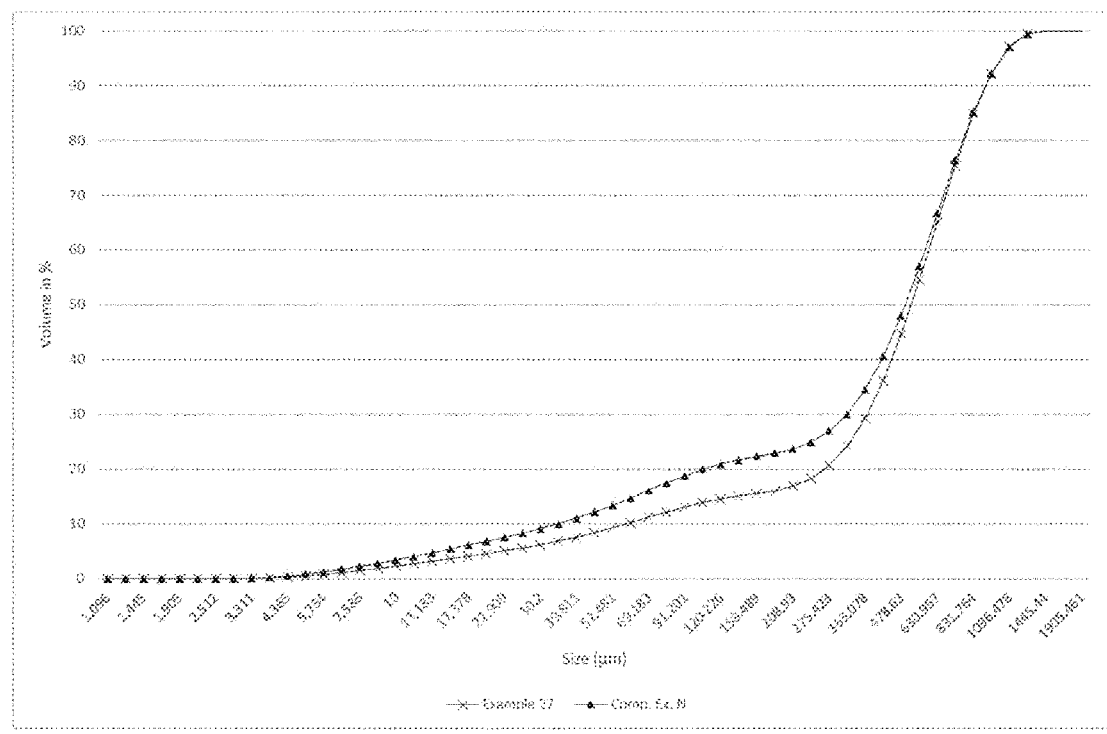
FIGS. 10 and 11 plot particle size distribution in accordance with working examples of the present invention.
Figure 11:
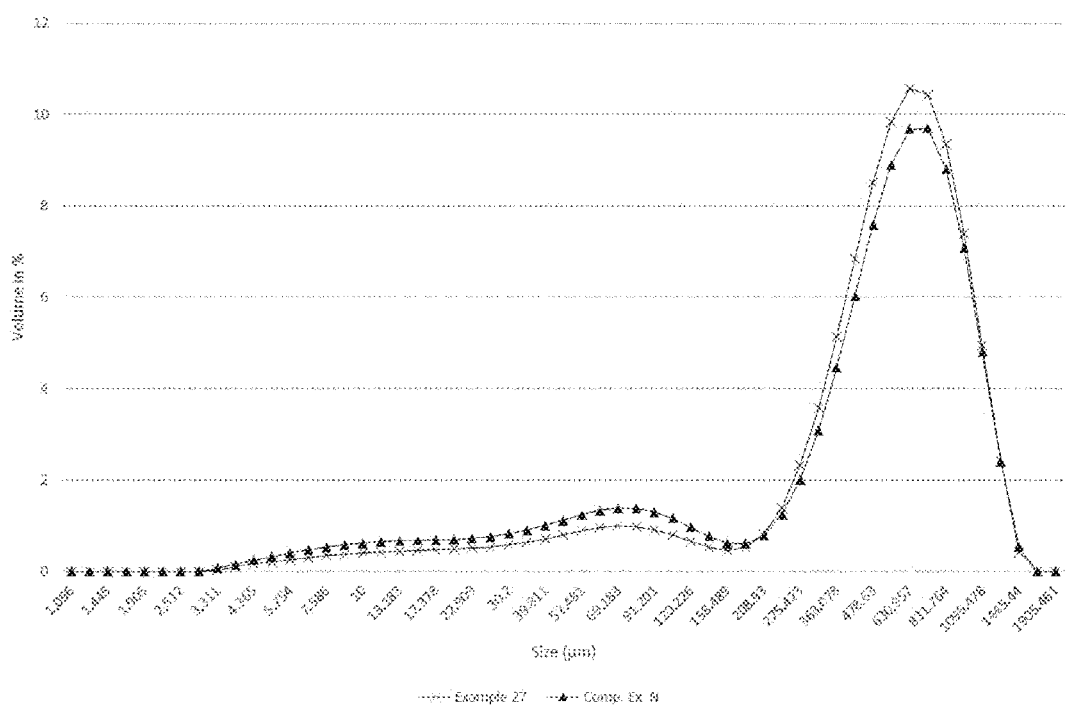

*Cichorium intybus* plant roots were sliced and dried to a dry matter amount suitable for conservation, corresponding to a dry matter content according to ISO 6496 (1999) as specified above of 88.0% w. The sliced and dried material was ground to a particulate starting material. Using a sieve with a pore size of 100 microns, a 'fines' fraction was separated off from the (now 'fines'-depleted) main fraction. Subsequently, portions of the 'fines' fraction and of the main fraction were recombined to prepare two compositions: a composition having 20% by weight of particles having a size lower than 100 microns (Example 27), and a composition having 30% by weight of particles having a size lower than 100 microns (Comparative Example N). Particle size distribution measurements on these Example 27 and Comparative Example N have been carried out according to the above-mentioned procedures, from which the results are shown in FIG. 10 (cumulative) and 11.

Figure 12:
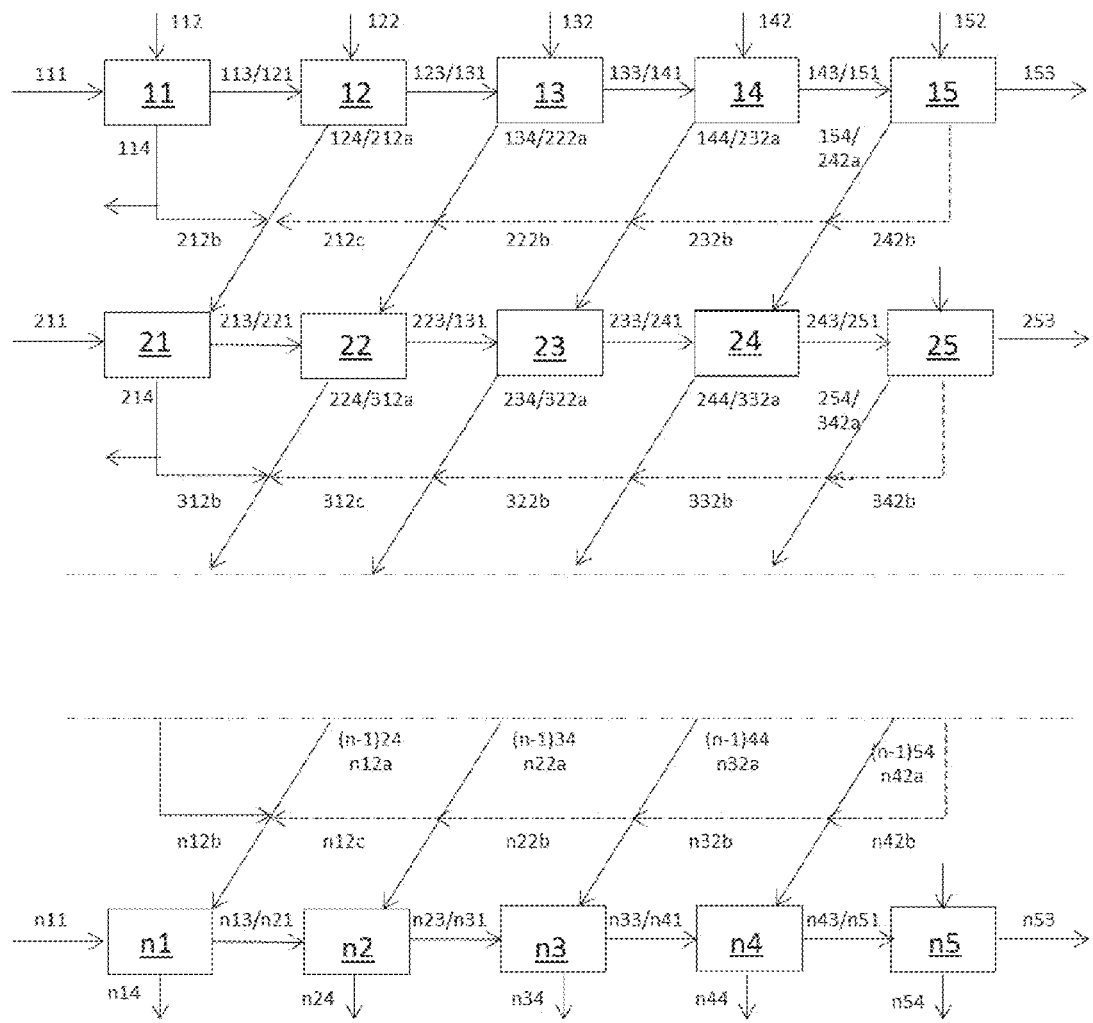
FIG. 12 schematically illustrates a multi-step filtration experiment in accordance with the present invention.
Figure 13:
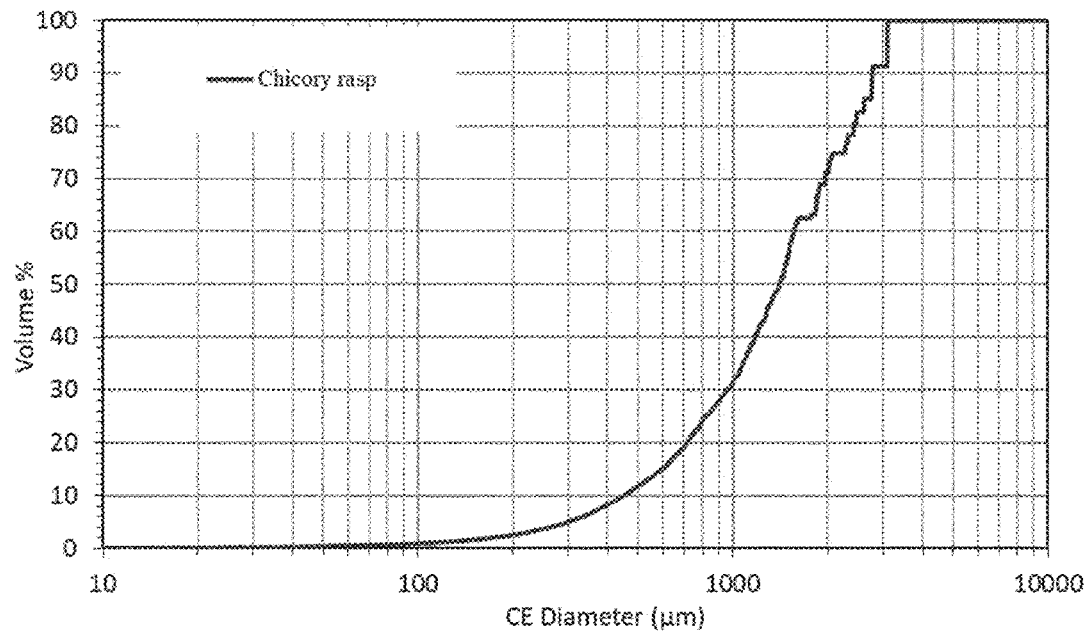
FIG. 13 plots volume over particle size in accordance with a working example of the present invention.

A multi-step filtration experiment was carried out according to FIG. 12. The experiment comprises a number of cycles 1, 2, . . . , n, and each of these cycles comprises 5 steps 11-15; 21-25; n1-n5. In cycle 1, 45 grams of composition (111) was contacted for 150 seconds with a bath of 300 grams of warm water (112) at a temperature of 75° C. in step 11, and filtered by vacuum filtration to obtain a retentate or cake (113) on the filter with no cracks and a juice or filtrate (114). The filtrate 114 was collected. In each of the subsequent steps 12-15 of this cycle, 200 grams of warm water (75° C.) was poured over the filter with the cake from the previous step, and the filtrates were collected. In the last step 15, the filtration was carried out until cracks became visible in the cake, and the filtrate was furthermore pressed by hand. The subsequent cycles were carried out in a similar way, however instead of using warm water, a mixture of the obtained filtrates of the previous cycle was used in all of the steps but the last step. In the first step of the cycles subsequent to the first cycle, the bath consists of the filtrate of the second step of the previous cycle (i.e. step 12) as 212a, supplemented to a total of 300 grams with filtrate of the first step of the previous cycle (i.e. step 11), as 212b, which was, were necessary, diluted with the filtrate obtained from the last step of the previous cycle (i.e. step 15), as 212c, in order to obtain a maximum calculated solute concentration at the inlet of 16° Brix, in order to avoid crystallization during extraction. In the second to the fourth steps of the subsequent cycles, instead of using warm water, a mixture of the filtrate obtained from the next step of the previous cycle and the filtrate from the last step of the previous cycle, totaling to 200 grams and at a temperature of 75° C. was used.

With Example 27, two experiments could be completed with 10 cycles, wherein the total filtration time of the 10th cycle amounted to 1292 and 986 seconds, hence 228 seconds per step on average. With Comparative Example N, two experiments were carried out, which each were aborted during the third cycle, since the filtration time in the 3rd cycle took more than 900 seconds per step.

In this experiment, the processing of material having a fraction of particles with particle size smaller than 100 μm of 20% by volume of the total composition went favorably; by contrast, the processing of material having a fraction of particles with particle size smaller than 100 μm of 30% by volume of the total composition presented significant problems as the filtration time was unacceptably long.

Experiment 10: Different Freshly Ground Plant Roots

*Cichorium intybus* plant roots were sliced, and freshly ground to a particulate starting material and sieved with sieves with a specific pore size. The particle size distribution of the sample of Example 28 was measured via image analysis. The sample had a $D_{10}$ of 454 μm, a $D_{50}$ of 1405 μm and a $D_{90}$ of 2778 μm. The sample had only 2 vol. % of particles smaller than 0.15 mm and no particles bigger than 4.0 mm.

Jerusalem Artichoke roots were sliced, and freshly ground to a particulate starting material and sieved with sieves with a specific pore size. The particle size distribution of the sample of Example 29 was measured via image analysis. The sample had a $D_{10}$ of 907 μm, a $D_{50}$ of 1913 μm and a $D_{90}$ of 3406 μm. The sample had only 0.3 vol. % of particles smaller than 0.15 mm and no particles bigger than 4.0 mm.

Freshly sliced *Cichorium intybus* plant roots were provided in cossette form as Comparative Example P.

55 grams of the samples were brought in contact with 60 grams of water. During extraction, the water was kept at a temperature $T_{extr}$ of 65° C. and a refractometer was used in order to determine the concentration of dissolved substances over a time frame of about 1 h (3600 s).

Figure 14:
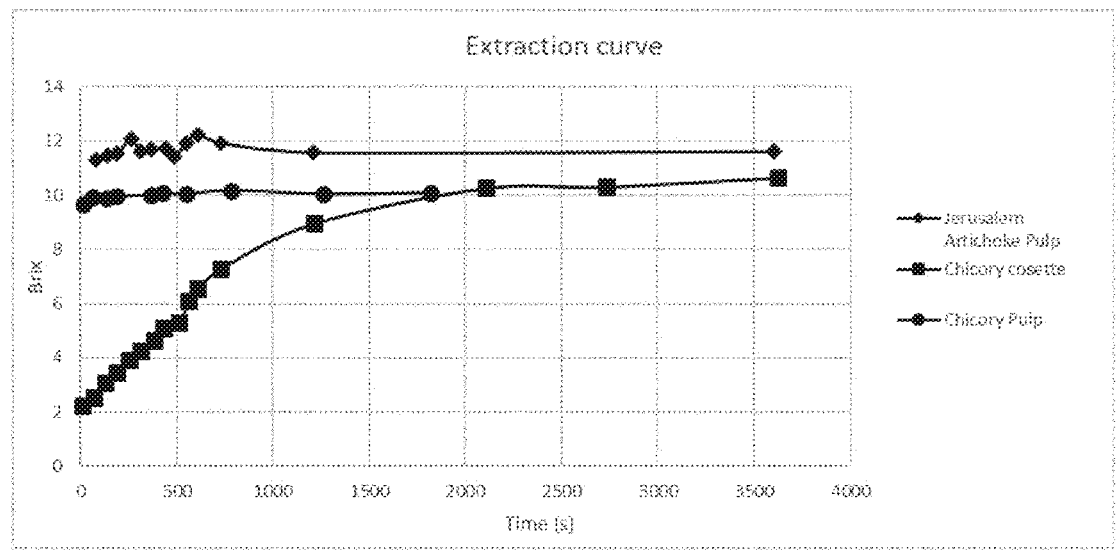
FIG. 14 plots rate of extraction over time in accordance with a working example of the present invention.

FIG. 14 demonstrates a faster rate of extraction and higher final solute concentration rates after 1 h when using ground powders from *Cichorium intybus* and Jerusalem Artichoke plants roots which are sieved with sieves to obtain a particle size distribution as claimed, compared to cossettes of fresh *Cichorium intybus* roots.

Experiment 11: Freshly Ground Plant Roots Centrifuged Before Extraction

*Cichorium intybus* plant roots were sliced, and freshly ground to a particulate starting material and sieved with sieves with a specific pore size. The particle size distribution of the sample of Example 30 was measured via image analysis. The sample had a $D_{10}$ of 885 μm, a $D_{50}$ of 1909 μm and a $D_{90}$ of 3216 μm. The sample had only 0.3 vol. % of particles smaller than 0.15 mm and 6 vol. % of particles bigger than 4.0 mm. The particulate plant roots had a solid content of 21.8 wt. %.

The particulate plant roots were then centrifuged in a prior separation step to yield a juice separated from pulp. The juice contains a Brix of 23.5 wt. %. The pulp has a solid content of 27.3 wt. % from where solubles is 18.6° Bx.

The pulp was then subjected to an extraction during 2.5 min with a 5 Bx solution (ratio 55 g pulp/60 g water) at 65° C. and filtrating the juice from the solids yielded a juice having a Brix of 11.5%

The retentate was then further subjected to a second extraction (38.8 g retentate/76.2 g water) during 2.5 min at a temperature of 65° C. The filtrated juice had a Brix of 3.8°. The solid part had a solid content of 18.7 wt. % from where solubles is 3.8° Bx.

When comparing Experiment 11—i.e. including the prior separation step—with Experiment 10—i.e. without a prior separation step—it was established that implementation of the prior separation step in case the inulin-containing plant material is not dried before providing the inulin-containing plant material in particulate form:

- significantly facilitated reaching the desired temperature for the extraction;
- significantly improved the functioning of the filtration after the extraction;
- significantly reduced the need for evaporating water from the filtrated juice;
- reduced the risk of degradation of inulin.

The invention claimed is:

1. A method for obtaining an inulin-containing composition, comprising the steps of:
   (1) providing an inulin-containing plant material in particulate form, wherein the particles have a particle size distribution such that at most 45 vol % of the particles has a size≤0.15 mm, and at least 90 vol % of the particles has a size≤4.0 mm;
   (2) subjecting the particulate inulin-containing plant material provided in step (1) to an extraction step comprising contacting the particulate inulin-containing plant material with an aqueous extractant and extracting the inulin from the plant material to the extractant to obtain an inulin-enriched juice and an inulin-depleted pulp wherein the extraction step or at least one of the plurality N of extraction steps have a duration per extraction step of between 10 and 300 sec; and wherein the temperature of the extractant in the extraction step or in at least one of the plurality N of extraction steps is provided between 60° C. and 75° C.; and
   (3) separating the inulin-enriched juice as filtrate from the inulin-depleted pulp as retentate wherein the inulin-containing plant material is dried to a dry matter content of at least 80 wt. %, as measured by ISO 6496 before providing the inulin-containing plant material in said particulate form, or wherein the inulin-containing plant material is not dried before providing the inulin-containing plant material in said particulate form, and said particulate inulin-containing plant material is subjected to a prior separation step to remove a juicy fraction therefrom before said extraction.

2. The method according to claim 1, wherein at most 30 vol % of the particles has a size≤0.15 mm, and at least 90 vol % of the particles has a size≤3.0 mm.

3. The method according to claim 1, wherein at most 30 vol % of the particles has a size≤0.10 mm, and at least 90 vol % of the particles has a size≤2.0 mm.

4. The method according to claim 1, wherein at most 25 vol % of the particles has a size≤0.10 mm, and at least 70 vol % of the particles has a size≤1.0 mm.

5. The method according to claim 1, wherein at least 5 vol %, preferably at least 10 vol % of the particles has a size≤0.15 or 0.10 mm.

6. The method according to claim 1, wherein the particulate inulin-containing plant material is subjected to a plurality N of extraction steps, wherein N≥2.

7. The method according to claim 6, wherein the inulin-containing plant material is dried and the aqueous extractant has a carbohydrate content ranging from 0° Brix to 40° Brix.

8. The method according to claim 6, wherein all of the extraction steps, have a duration per extraction step of between 10 and 300 sec, and/or wherein the plurality of extraction steps have a total duration of at most 20 min.

9. The method according to claim 1, wherein the extraction step or at least one of the plurality of extraction steps is carried out in a countercurrent flow, wherein an input material is provided to flow in a direction opposite to the direction of flow of the aqueous extractant.

10. The method according to claim 9, wherein the particulate inulin-containing plant material is subjected to a plurality N of extraction steps, wherein N≥2, and wherein a retentate obtained in an extraction step n of a continuous extraction is used as input material of a subsequent extraction step n+1, wherein n+1≤N.

11. The method according to claim 9, wherein the particulate inulin-containing plant material is subjected to a plurality N of extraction steps, wherein N≥2, and, wherein the filtrate obtained in the extraction step n+1 is used as aqueous extractant of the extraction step n.

12. The method according to claim 9, wherein the particulate inulin-containing plant material is subjected to a plurality N of extraction steps, wherein N≥2, and, wherein the aqueous extractant of an extraction step n has a higher carbohydrate content measured in ° Brix than the aqueous extractant of a subsequent extraction step n+1.

13. The method according to claim 9, wherein the particulate inulin-containing plant material is subjected to a plurality N of extraction steps, wherein N≥2, and, wherein the amount of extraction steps N is at least 4 and the carbohydrate content of the aqueous extractant decreases from 30° Brix in the first extraction step to 0° Brix in a final extraction step.

14. The method according to claim 1, wherein the extraction step or at least one of the plurality N of extraction steps, and separating the filtrate from the retentate is carried out by a vacuum band filter, a pressure filter and/or rotating vacuum filter and/or centrifuge.

15. The method according to claim 1, wherein the weight ratio between the amount of final juice or filtrate and the amount of input material corrected to a typical dry substance of fresh material of 25% in all the extraction steps is between 0.5 and 1.2.

16. The method according to claim 1, further comprising the steps of:
   (4) adding a flocculation agent to the extractant, for forming at least one floc with at least one contaminant of the extractant; and
   (5) discharging the floc after the floc formation.

17. The method according to claim 1, wherein the extraction or at least one of the plurality N of extraction steps, and/or at least the step of the optional floc formation, is carried out at a pH of between 3 and 5.

18. The method according to claim 1, wherein providing the inulin-containing plant material in particulate form is carried out by grinding and/or milling of the inulin-containing plant material, optionally followed by sieving.

19. The method according to claim 2, wherein drying the inulin-containing plant material to the dry matter content is carried out by any one of sun-drying or oven drying at a temperature of between 30° C. and 200° C.

* * * * *